United States Patent
Lemma (10) Patent No.: US 9,318,925 B2
(45) Date of Patent: Apr. 19, 2016

(54) WIND TURBINE GENERATOR AND MAINTENANCE OF ITS MAIN BEARING

(71) Applicant: Edom Lemma, Brande (DK)

(72) Inventor: Edom Lemma, Brande (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 276 days.

(21) Appl. No.: 13/948,314

(22) Filed: Jul. 23, 2013

(65) Prior Publication Data

US 2014/0021816 A1    Jan. 23, 2014

(30) Foreign Application Priority Data

Jul. 23, 2012  (EP) ..................................... 12177444

(51) Int. Cl.
| | |
|---|---|
| *H02K 7/102* | (2006.01) |
| *H02K 15/00* | (2006.01) |
| *F03D 1/00* | (2006.01) |
| *H02K 1/30* | (2006.01) |
| *H02K 15/02* | (2006.01) |
| *F03D 9/00* | (2006.01) |

(52) U.S. Cl.
CPC ........ *H02K 1/30* (2013.01); *F03D 1/001* (2013.01); *F03D 1/003* (2013.01); *F03D 9/002* (2013.01); *H02K 7/102* (2013.01); *H02K 15/0006* (2013.01); *H02K 15/02* (2013.01); *F05B 2220/7066* (2013.01); *F05B 2260/30* (2013.01); *Y02E 10/725* (2013.01); *Y02E 10/728* (2013.01); *Y02P 70/523* (2015.11); *Y10T 29/49012* (2015.01)

(58) Field of Classification Search
CPC ...... H02K 1/30; H02K 15/0006; F03D 1/001; F03D 1/003
USPC .......................... 290/55, 54; 310/77; 415/170
See application file for complete search history.

(56) References Cited

U.S. PATENT DOCUMENTS

| | | | | |
|---|---|---|---|---|
| 2009/0026771 | A1* | 1/2009 | Bevington et al. | 290/55 |
| 2011/0121579 | A1* | 5/2011 | Eriksen et al. | 290/55 |

FOREIGN PATENT DOCUMENTS

| | | | |
|---|---|---|---|
| DE | 102004028746 | A1 * | 12/2005 |
| DE | 102009015926 | A1 | 10/2010 |
| EP | 1772624 | A2 | 4/2007 |
| EP | 2381560 | A1 | 10/2011 |
| EP | 2148090 | B1 | 12/2011 |

* cited by examiner

*Primary Examiner* — Quyen Leung
*Assistant Examiner* — Eric Johnson (57) ABSTRACT

A generator for a wind turbine is proposed. The generator has a stator, a rotor having a rotor housing surrounding the stator, and a main bearing to support the rotor housing such that the rotor housing is rotatable about an axis of rotation. The stator has a plurality of cylindrical elements extending in parallel with the axis of rotation, and the rotor has a front element having a plurality of holes at positions alignable with the cylindrical elements, such that the rotor is fixable to the stator by inserting a fastening member through a cylindrical element and a hole aligned with the cylindrical element.

10 Claims, 5 Drawing Sheets

WIND TURBINE GENERATOR AND MAINTENANCE OF ITS MAIN BEARING

CROSS REFERENCE TO RELATED APPLICATIONS

The present application claims priority to European Patent Office application No. 12177444.2 EP filed Jul. 23, 2012, the entire content of which is hereby incorporated herein by reference.

FIELD OF INVENTION

The present invention relates to the field of wind turbines and to maintenance of wind turbines. In particular, the present invention relates to direct drive outer rotor single bearing wind turbines and to maintenance of the bearing of such wind turbines.

BACKGROUND OF INVENTION

Maintenance, repair and exchange of the main bearing in a direct drive outer rotor single bearing wind turbine is a complicated task as the direct drive permanent magnet generator forms the drive train of a direct drive generator and the main bearing is installed upwind of the drive train. Until now this task has involved disassembling the generator from the bed frame of the wind turbine and performing the actual maintenance work at ground level. Besides the lowering and raising of the large and heavy generator parts, the disassembly and assembly of the generator is a cumbersome task due to the small tolerances on the relative positioning of the rotor and stator parts of the generator with respect to each other. Accordingly, a significant amount of time, equipment and energy is necessary to carry out such maintenance.

EP 2 148 090 B1 describes a wind power turbine in which the blade assembly can be locked with respect to the stator of the electric generator regardless of the angular position of the blade assembly with respect to the stator. More specifically, EP 2 148 090 B1 proposes to achieve the desired locking by tightening screws extending through inclined holes in the blade assembly such that they pressure engage annular grooves which are formed in the stator assembly.

There may be a need for a simple way of performing maintenance on the main bearing of a direct drive single bearing wind turbine.

SUMMARY OF INVENTION

This need may be met by the subject matter according to the independent claims. Advantageous embodiments of the present invention are described by the dependent claims.

According to a first aspect of the invention, there is provided a generator for a wind turbine. The described generator comprises (a) a stator, (b) a rotor having a rotor housing surrounding the stator, and (c) a main bearing adapted to support the rotor such that the rotor housing is rotatable about an axis of rotation. The stator comprises a plurality of cylindrical elements extending in parallel with the axis of rotation, and the rotor comprises a front element having a plurality of holes at positions alignable with the cylindrical elements, such that the rotor is fixable to the stator by inserting a fastening member through a cylindrical element and a hole aligned with the cylindrical element.

This aspect of the invention is based on the idea that by allowing the rotor housing to be fixed to the stator by inserting a fastening member through a cylindrical element of the stator and a hole of the rotor front element, which hole is aligned with the cylindrical element, the rotor can be suspended and axially locked such that maintenance work on the main bearing can take place.

The rotor housing is preferably substantially cylindrically shaped and comprises a plurality of permanent magnets arranged on the inner surface of the rotor housing.

The main bearing preferably comprises an inner race and an outer race. The inner race may be fastened to a main shaft extending through the central part of the generator in the direction of the axis of rotation. The outer race may be fastened to the rotor, such that the rotor, and thereby the rotor housing, is rotatable around the stator.

Thereby, when the rotor housing is rotated around the stator, the permanent magnets will induce electrical current in corresponding stator coils. This generator construction is also referred to as an "outer rotor generator". The rotor housing and stator are preferably designed such that only a relatively small air gap, such as in the range of 5 mm to 10 mm, is present between the permanent magnets and the stator lamination stacks.

The cylindrical elements of the stator may be constituted by pipes or tubular elements having a substantially circular cross-sectional shape, although in some embodiments the cylindrical elements may have a quadratic or rectangular cross-sectional shape. The cylindrical elements are preferably made from a strong material, such as metal, and may be arranged at the stator assembly by welding or they may be formed as integral parts of the stator. The cylindrical elements preferably have a length in the range of 100 mm to 200 mm and an outer diameter in the range of 50 mm to 150 mm. The inner diameter of the cylindrical elements is preferably in the range of 25 mm to 50 mm.

The front element of the rotor may be one or more rotor front plates extending from the rotor housing towards the axis of rotation. The front plate(s) is/are preferably arranged at the end of the rotor which is supposed to be closest to a rotor blade hub when the generator is mounted in a wind turbine. The holes may for example have a circular, quadratic or rectangular cross-section and a diameter in the range of 25 mm to 50 mm. The cross-sectional shape and diameter of the holes may in some embodiments be the same as the cross-sectional shape and diameter of the cylindrical elements. However, in other embodiments the cross-sectional shape and/or diameter of the holes may be different from the cross-sectional shape and/or diameter of the cylindrical elements.

In the present context, the notion "holes at positions alignable with the cylindrical elements" is to be understood such that a hole can be aligned with a cylindrical element along a line parallel with the rotational axis by rotating the rotor to at least one specific angular position.

Accordingly, when a fastening member having a shape and dimension fitting the holes and cylindrical elements is inserted through a cylindrical element and a hole aligned with the cylindrical element, the positional relationship (in the radial direction, i.e. in the direction perpendicular to the axis of rotation) of the rotor and the stator is maintained even if the main bearing is removed or disassembled. In other words, by inserting a fastening member through a cylindrical element and a hole aligned therewith, the rotor can be suspended. Thereby, it is possible to perform maintenance work on the main bearing without having to remove the rotor and/or the stator and without risking misalignment of the rotor and the stator in the radial direction which could lead to sticking of the rotor permanent magnets to the stator assembly.

It should be noted that the suspension of the rotor may be further improved by inserting one or more further fastening members through one or more pairs of aligned cylindrical elements.

According to an embodiment of the invention, the cylindrical elements and/or the holes and/or the fastening members are threaded.

In this case, the fastening members may be screwed into the cylindrical elements and/or the holes. Thereby, also the axial positional relationship (i.e. in the direction of the axis of rotation) between the rotor and the stator may be maintained during maintenance of the main bearing.

According to a further embodiment of the invention, the cylindrical elements and the holes are provided at positions that are symmetrical around the axis of rotation.

This may for example be achieved by arranging the holes and cylindrical elements at positions which have the same distance to the axis of rotation and which are angularly displaced with a constant angle, such as 15°, 30°, 45°, 60°, 90° or 120°, or another integer fraction of 360°.

According to a further embodiment of the invention, the fastening elements are storable within a main shaft or nacelle of a wind turbine.

By storing the fastening elements within the main shaft or nacelle, for example in an appropriate box or bag, the fastening elements will be readily available to a maintenance worker who has been raised up-tower (i.e., to the top of the wind turbine tower) in order to perform maintenance work on the main bearing. After the maintenance work is completed, the fastening elements may be stored again such that they are ready for future maintenance work.

According to a further embodiment of the invention, the generator further comprises a rotor brake and lock.

The rotor brake may for example be a disc brake arranged at the end of the rotor opposite to the rotor front. By operating the brake, the rotational speed of rotor can be reduced and even set to zero, i.e. where the rotor does not rotate. The rotor lock may be operated to lock the rotor at a desired angular position.

The rotor brake and lock may thus facilitate the adjustment of the rotor to a position where the holes and cylindrical elements are aligned such that the fastening member(s) can be inserted, in particular under windy conditions.

In a further embodiment of the invention, the rotor brake comprises a brake disc, the rotor lock comprises a lock bracket and a brake and lock bracket fixed relative to the stator, the lock bracket having a recess for receiving the brake disc and being adapted to engage with the brake disc to thereby lock the rotor at a predetermined angular position. A further plurality of cylindrical elements extending in parallel with the axis of rotation is arranged at the lock bracket, and the brake disc comprises a plurality of holes alignable with the cylindrical elements of the lock bracket, such that the rotor is further fixable to the stator by inserting a fastening member through a cylindrical element of the lock bracket and a hole of the brake disc aligned with the cylindrical element of the lock bracket.

The above discussed features of the holes, cylindrical elements and fastening members at the front of the generator apply equally to the further cylindrical elements, holes of the brake disc and bracket and fastening members of the present embodiment.

By also allowing the use of fastening members towards the rear side of the generator, the suspension of the rotor can be further stabilized.

According to a further embodiment of the invention, the stator comprises a front stator plate, a rear stator plate and a plurality of stator segments distributed around the axis of rotation, the stator segments being supported by the front stator plate and the rear stator plate.

The front stator plate and the rear stator plate are preferably made of metal or another strong material and are both arranged around the main shaft such that they may support the stator segments. The front stator place is arranged at a position in the axial direction (axis of rotation) which is close to the front (or drive end) of the generator, i.e. the end of the generator which is supposed to face the blade hub assembly, whereas the rear stator plate is arranged at a position close to the rear (or non-drive end) of the generator, i.e. the end of the generator opposite to the drive end in the direction of the axis of rotation. Each stator segment comprises one or more coils in which electric current may be induced when the rotor is rotating.

According to a further embodiment of the invention, the cylindrical elements are arranged at the front stator plate.

The cylindrical elements may preferably be welded onto the front stator plate at a number of positions around or in the vicinity of the circumference of the stator plate. The positions may preferably have the same radial distance to the axis of rotation and be angularly displaced with the same angular amount.

According to a second aspect of the invention, there is provided a wind turbine. The described wind turbine comprises a generator according to the first aspect and/or any of the above embodiments any of the embodiments described above.

This aspect of the invention is based on the idea that by allowing the rotor to be fixed to the stator by inserting a fastening member through a cylindrical element of the stator and a hole of the rotor front element, which hole is aligned with the cylindrical element, the rotor can be suspended such that maintenance work on the main bearing of the wind turbine can take place.

According to a third aspect of the invention, there is provided a method of manufacturing a generator for a wind turbine. The described method comprises (a) providing a stator, (b) providing a rotor having a rotor housing surrounding the stator, (c) providing a main bearing for supporting the rotor such that the rotor housing is rotatable about an axis of rotation, (d) providing the stator with a plurality of cylindrical elements extending in parallel with the axis of rotation, and (e) providing a front element of the rotor housing with a plurality of holes at positions alignable with the cylindrical elements, such that the rotor is fixable to the stator by inserting a fastening member through a cylindrical element and a hole aligned with the cylindrical element.

This aspect of the invention is based on the idea that by providing the stator with a plurality of cylindrical elements and by providing the front element with a plurality of holes at positions alignable with the cylindrical elements, the rotor can be fixed to the stator by insertion of a fastening member through a cylindrical element of the stator and a hole of the rotor front element, which hole is aligned with the cylindrical element. Thereby, the rotor can be suspended such that maintenance work on the main bearing can take place.

The provided rotor housing is preferably substantially cylindrically shaped and comprises a plurality of permanent magnets arranged on the inner surface of the rotor housing.

The provided main bearing preferably comprises an inner race and an outer race. The inner race may be fastened to a main shaft extending through the central part of the generator in the direction of the axis of rotation. The outer race may be fastened to the rotor, such that the rotor, and thereby the rotor housing, is rotatable around the stator.

Thereby, when the rotor housing is rotated around the stator, the permanent magnets will induce electrical current in corresponding stator coils. This generator construction is also referred to as an "outer rotor generator".

The provided cylindrical elements of the stator may be constituted by pipes or tubular elements having a substantially circular cross-sectional shape, although in some embodiments the cylindrical elements may have a quadratic or rectangular cross-sectional shape. The cylindrical elements are preferably made from a strong material, such as metal, and may be arranged at the stator assembly by welding or they may be formed as integral parts of the stator.

The provided front element of the rotor may be one or more rotor front plates extending from the rotor housing towards the axis of rotation. The front plate(s) is/are preferably arranged at the end of the rotor which is supposed to be closest to a rotor blade hub when the generator is mounted in a wind turbine. The cross-sectional shape and diameter of the holes may in some embodiments be the same as the cross-sectional shape and diameter of the cylindrical elements. However, in other embodiments the cross-sectional shape and/or diameter of the holes may be different from the cross-sectional shape and/or diameter of the cylindrical elements.

In the present context, the notion "holes at positions alignable with the cylindrical elements" is to be understood such that a hole can be aligned with a cylindrical element along a line parallel with the rotational axis by rotating the rotor to at least one specific angular position.

Accordingly, when a fastening member having a shape and dimension fitting the holes and cylindrical elements is inserted through a cylindrical element and a hole aligned with the cylindrical element, the positional relationship (in the radial direction, i.e. in the direction perpendicular to the axis of rotation) of the rotor and the stator is maintained even if the main bearing is removed or disassembled. In other words, by inserting a fastening member through a cylindrical element and a hole aligned therewith, the rotor can be suspended. Thereby, it is possible to perform maintenance work on the main bearing without having to remove the rotor and/or the stator and without risking misalignment of the rotor and the stator in the radial direction.

According to a fourth aspect of the invention, there is provided a method for maintenance of a main bearing of a wind turbine generator according to the first aspect and/or any of the embodiments described above. The described method comprises (a) rotating the rotor to a position where the plurality of holes are aligned with the cylindrical elements in the axial direction, (b) stopping the rotor, (c) fixating the rotor housing to the stator by inserting a fastening member through a cylindrical element and a hole aligned with the cylindrical element, and (d) performing maintenance work on the main bearing.

Also this aspect of the invention is based on the idea that the rotor is suspended such that maintenance work on the main bearing can take place without disassembling the generator.

The rotation and stopping of the rotor at a position where the holes are aligned with the cylindrical elements may be carried out by operating a rotor lock and/or brake of the generator.

According to a further embodiment of the invention, the maintenance work comprises repairing or exchanging parts of the main bearing or exchanging the entire main bearing.

According to a further embodiment of the invention, the method further comprises removing a rotor hub and blade assembly from the main bearing prior to performing the maintenance work.

The removal of the rotor hub and blade assembly may be assisted by a crane which can also hold the rotor hub and blade assembly at a position close to the generator but leaving enough room for the maintenance worker(s) to carry out the maintenance work on the main bearing.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular combinations of features of the method type claims and features of the apparatus type claims, is part of the disclosure of this document.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment to which, however, the invention is not limited.

DETAILED DESCRIPTION OF INVENTION

The illustration in the drawing is schematically. It is noted that in different figures, similar or identical elements are provided with the same reference signs or with reference signs, which are different from the corresponding reference signs only within the first digit.

Figure 1:
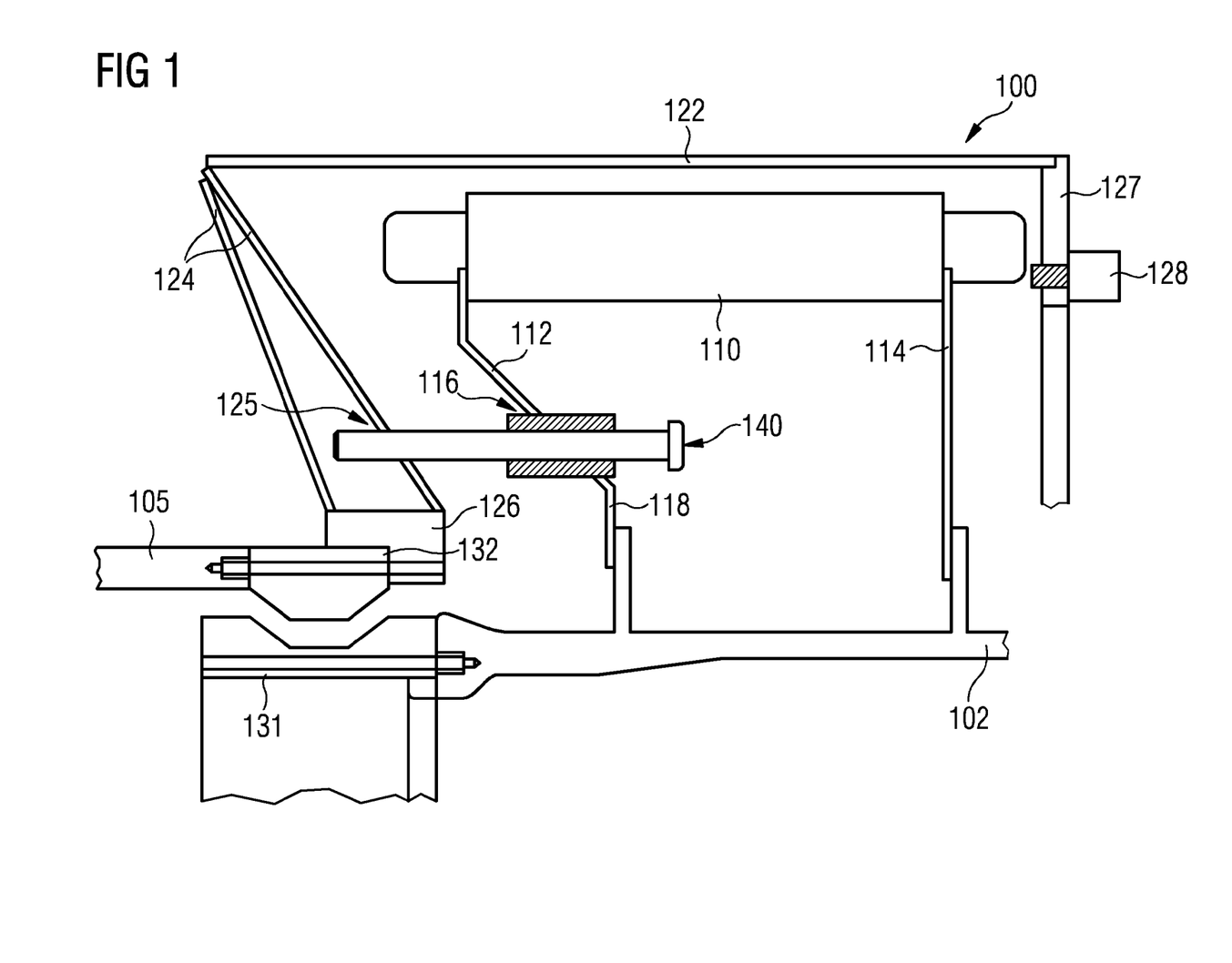
FIG. 1 shows a schematic overview of a wind turbine generator according to an embodiment.

FIG. 1 shows a schematic overview of a wind turbine generator 100 according to an embodiment.

The generator 100 comprises a stator and a rotor and is a so-called outer rotor configuration in which the rotor surrounds the stator. The stator comprises a plurality of stator segments 110 (only one segment 110 is shown in the sectional view of FIG. 1) symmetrically distributed around a main shaft 102 which is coincident with the generator's axis of rotation. The stator segments 110 are supported by a front stator plate 112 and a rear stator plate 114 which are both fixed to the main shaft 102. The front stator plate 112 is arranged closer to the end of the generator 100 which is supposed to engage with a rotor hub 105 of a wind turbine (not shown) than the rear stator plate 114.

The rotor comprises a cylindrical rotor housing 122 symmetrically arranged around the main shaft 102. At the end towards the rotor hub 105, the rotor comprises front elements (or rotor front plates) 124 which extend inwards from the end of the cylindrical rotor housing 122 towards the main shaft. The rotor further comprises a bearing pocket 126 for engaging with a main bearing. More specifically, the bearing pocket 126 engages with outer race 132 of the main bearing. The inner race of the main bearing is connected to main shaft 102 such that the rotor may rotate around its rotational axis. The front stator plate comprises an opening 118 for bearing bolt tightening.

At the rear end of the generator 100, i.e. the end of the generator 100 opposite to the rotor hub 105, a rotor brake disc 127 and a rotor lock 128 are arranged such that the rotation of the rotor can be stopped and such that the rotor can be locked at a desired angular position.

The front stator plate 112 comprises a cylindrical element 116 or pipe which is arranged, e.g. by welding, such that it extends in a direction parallel with the axis of rotation. The front element 124 comprises a corresponding hole 125 which may e.g. be drilled through the front element 124. The hole 125 is provided at a position having the same radial distance to the axis of rotation as the cylindrical element. Thereby, the hole 125 and the cylindrical element 116 will be aligned in the direction of the axis of rotation at a given angular position of the rotor. In this aligned state, a fastening member 140 can be inserted through the cylindrical element 116 and through the hole 125 such that the fastening element extends in a direction parallel to the axis of rotation. Thus, when the fastening member 140 is inserted through the cylindrical element 116 and the hole 125, the rotor is supported by the stator, in particular by the front stator plate 112, and the rotor can be kept in position relative to the stator even if parts of the main bearing of or the entire main bearing are/is removed. In some embodiments, the cylindrical element 116 and/or the hole 125 is/are threaded. By providing the fastening member 140 with corresponding threads at least along the sections which are intended to engage with the cylindrical element and/or the hole, the fastening member 140 may further provide a fixation or stabilization of the rotor relative to the stator in the direction of the axis of rotation.

Accordingly, by inserting, possibly screwing, the fastening member 140 (which may be a threaded bolt) into the cylindrical element 112 and the hole 125, the rotor may be fixated relative to the stator in the axial and/or radial direction such that the main bearing may be disassembled without causing displacement or misalignment of the rotor and stator relative to each other.

Thereby, maintenance work can be performed on the main bearing without having to disassemble the generator and lowering the corresponding disassembled part to ground level.

The fastening member or members 140 may be stored within the main shaft 102 or nacelle (not shown) for convenient access by maintenance workers or they may be part of the tools that are carried by the maintenance workers.

Figure 2:
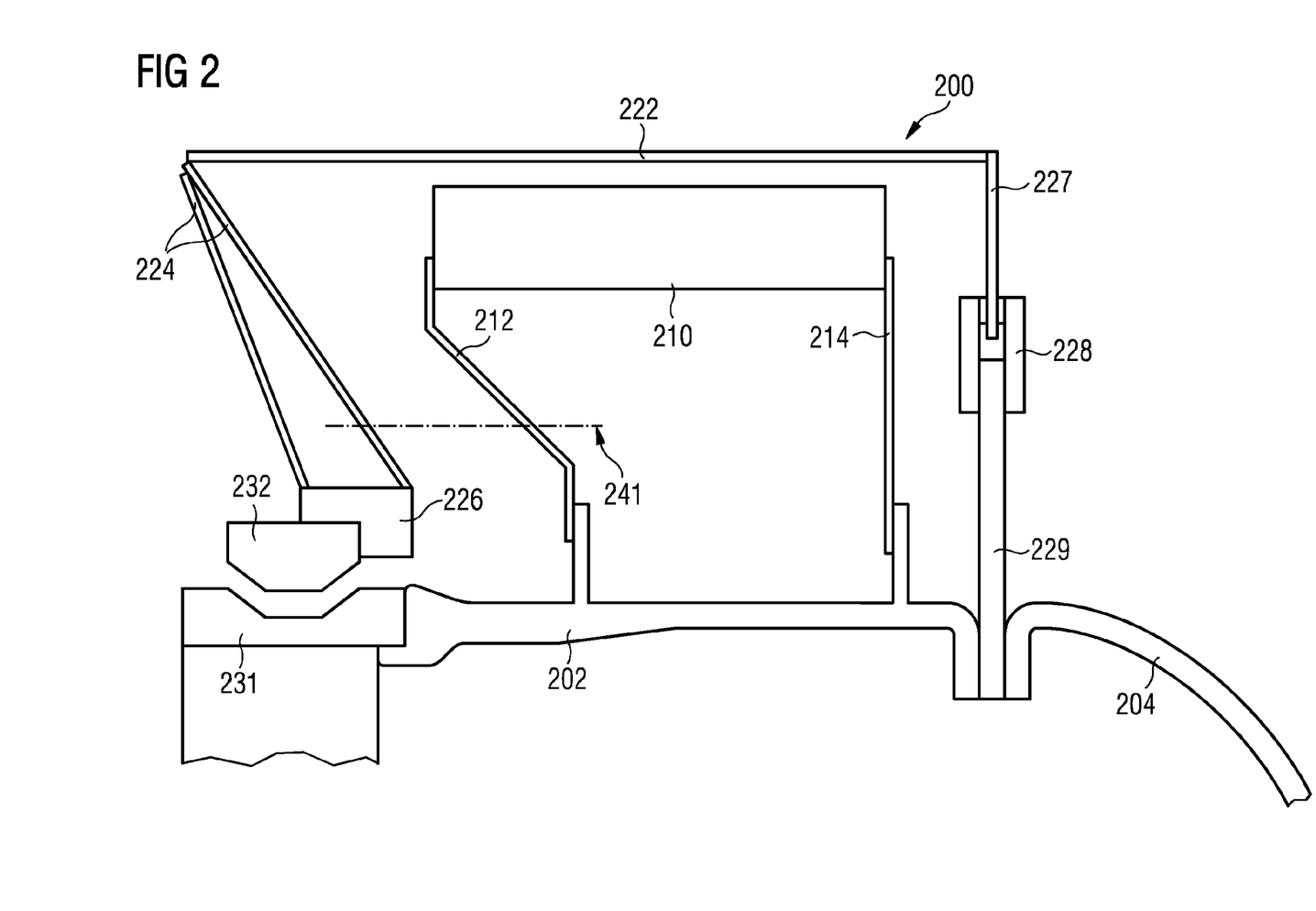
FIG. 2 shows a schematic overview of a wind turbine generator during maintenance according to an embodiment.

FIG. 2 shows a schematic overview of a wind turbine generator at an initial stage of a bearing maintenance procedure in accordance with an embodiment.

Most structural elements are similar to those of FIG. 1 and a repeated description of similar structural parts will accordingly be omitted.

More specifically, FIG. 2 shows a state where the rotor of the generator (which is arranged at a bed frame 204) has been locked in an appropriate angular position by means of the brake disc 227, rotor lock 228 and a brake and lock bracket 229 which is fixed relative to the main shaft 202 and bed frame 204. A fastening member 241 has been inserted through a cylindrical element (not shown) and a hole (not shown) aligned therewith In the state shown in FIG. 2, the rotor is floating, i.e. it is suspended by the fastening member 241, such that the positional relationship between the rotor and the stator will not change even if the main bearing or parts thereof is/are removed.

Figure 3:
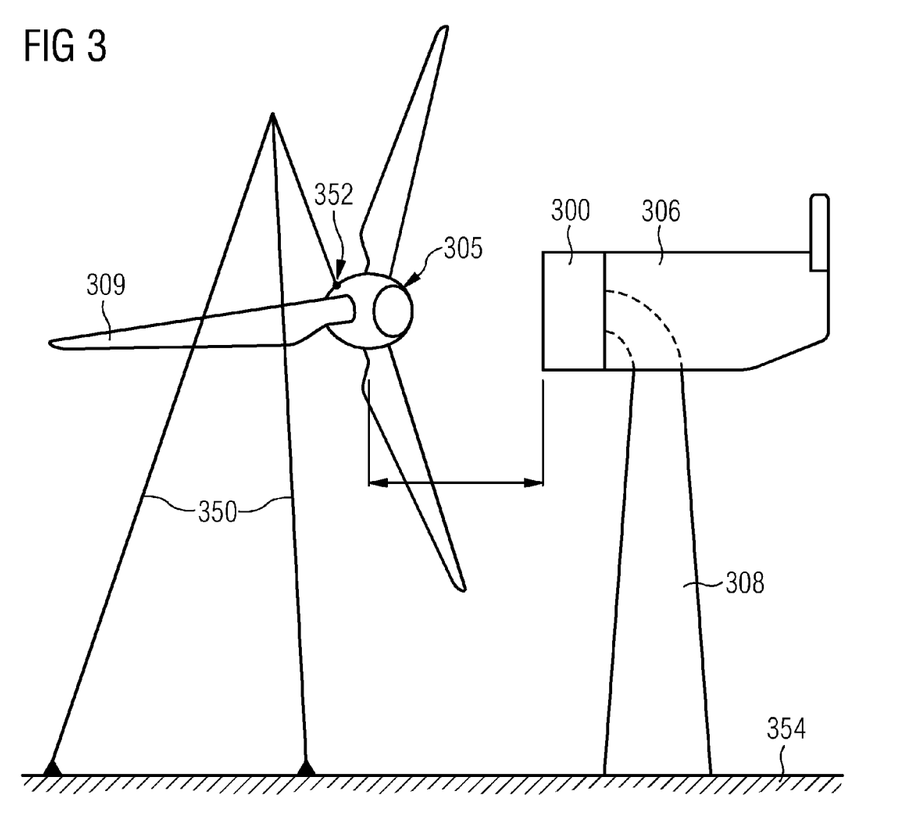
FIG. 3 shows a schematic overview of a wind turbine during maintenance in accordance with an embodiment.

FIG. 3 shows a schematic overview of a subsequent step of the maintenance procedure. More specifically, FIG. 3 shows (in the right-hand part of the drawing) the wind turbine generator 300 arranged beside a direct drive wind turbine nacelle 306 at the top of wind turbine tower 308. As shown in the left-hand part of the drawing, the rotor hub 305 and the rotor blades 309 are removed from the wind turbine by use of crane lifts 350 which engage with the rotor hub 305 at hoist point 352. By removing the rotor hub 305 and blades 309, there is free access to the main bearing (not shown). The crane lifts 350 may keep the rotor hub 305 and rotor blades 309 at a safe distance (indicated by arrows in the drawing) from the wind turbine during the maintenance work, such that even in case of strong wind, the rotor hub 305 and rotor blades 309 will not interfere with the maintenance work on the main bearing of the generator 300.

Thereby, it will not be necessary to take the rotor hub 305 and rotor blades 309 down to ground level 354. Thus, once the maintenance work is completed, the rotor hub 305 and rotor blades 309 can easily be remounted to the wind turbine by operating the crane lifts 350.

Figure 4:
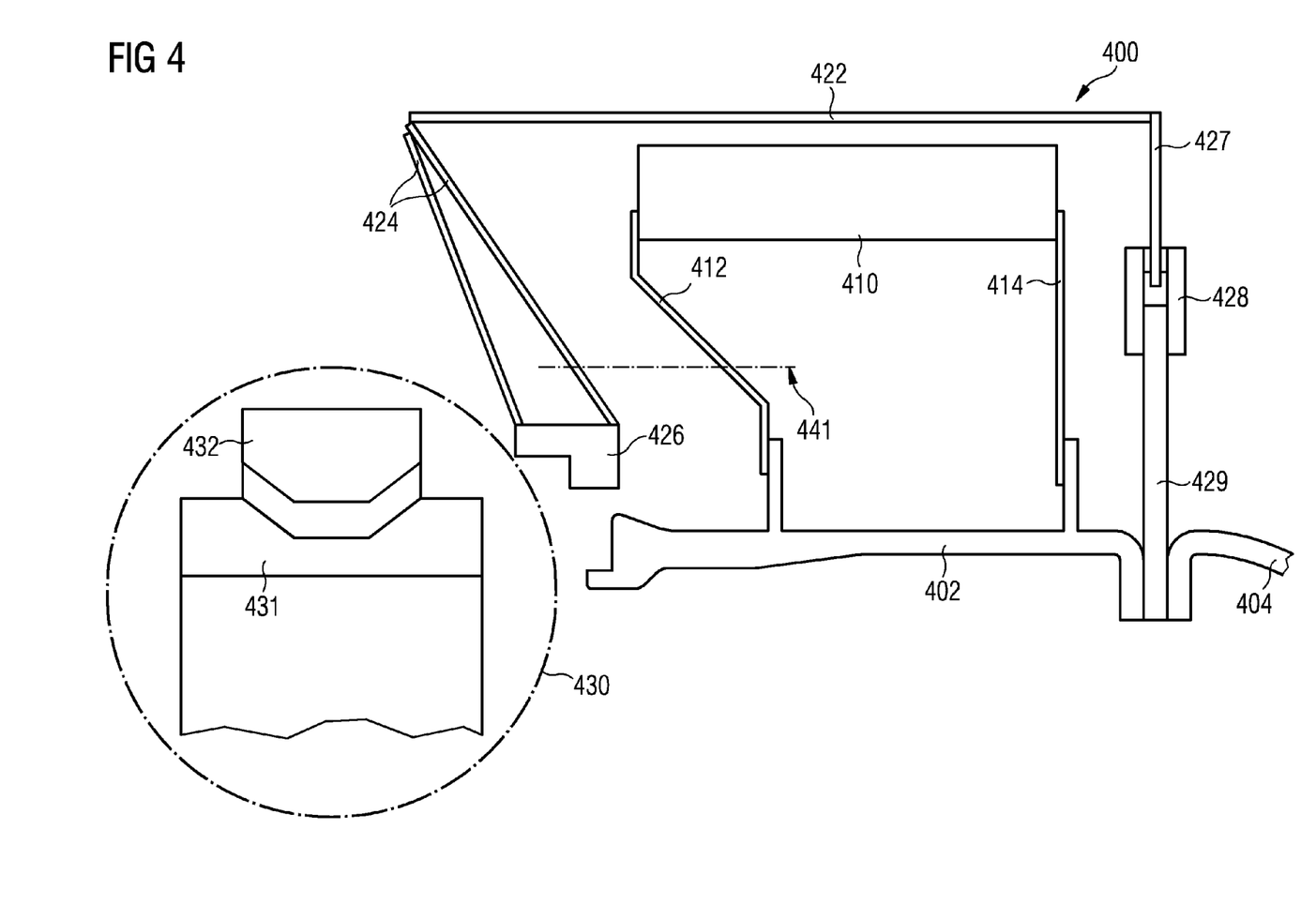
FIG. 4 shows a further schematic overview of a wind turbine generator during maintenance in accordance with an embodiment.

FIG. 4 shows a schematic overview of the wind turbine generator 400 during maintenance, i.e. in the state shown in FIG. 3.

The main bearing 430 has been removed from the generator 400 which has the rotor suspended by fastening member 441. Maintenance work, such as exchange of parts of the inner race 431 or the outer race 432 of the main bearing 430. Depending on the specific maintenance work to be carried out, the bearing 430 may be lowered to ground level or kept in the vicinity of the generator 400. In any event, the generator 400 does not need to be disassembled and the maintenance work can accordingly be carried out in an efficient and speedy manner.

Figure 5:
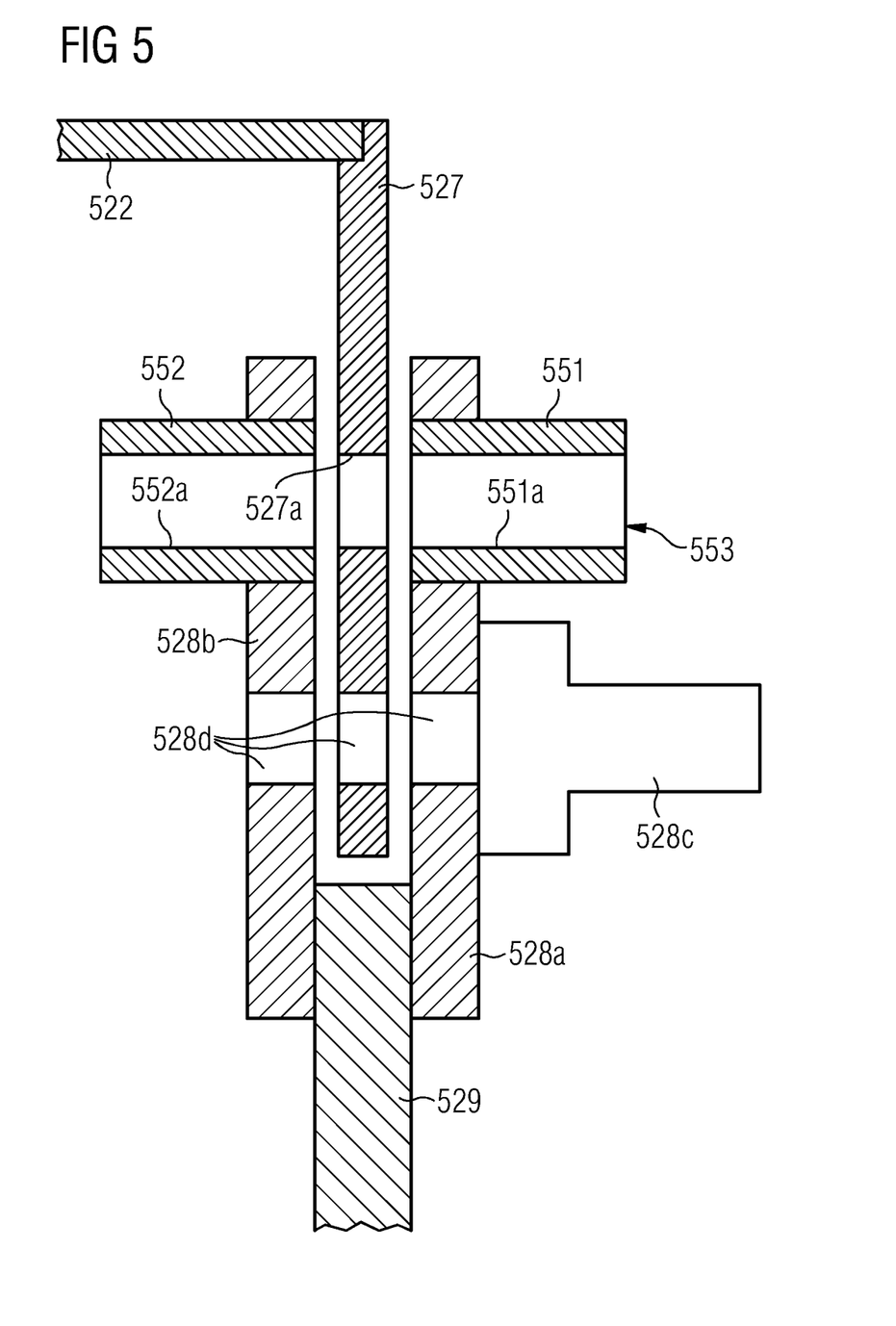
FIG. 5 shows a detailed view of a rotor lock arrangement in accordance with an embodiment.

FIG. 5 shows a detailed view of a rotor lock arrangement which may be implemented in the embodiments shown in any of FIGS. 1 to 4. As shown, the rotor housing 522 is equipped with rotor brake disc 527. At the inner (to the left in the drawing) and outer (to the right) side of the rotor brake disc 527, there are arranged an inner part 528b and an outer part 528a of a rotor lock bracket. The rotor lock is connected to brake and lock bracket 529 and is operable to lock the angular position of the rotor housing 522 by insertion of rotor lock apparatus into and through holes 528d.

At the outer part 528a of the rotor lock bracket, there is further arranged an outer cylindrical element 551 comprising an inner surface 551a. Similarly, an inner cylindrical element 552 comprising an inner surface 552a is arranged at the inner part 528b of the rotor lock bracket. The cylindrical elements 551 and 552 are aligned in the axial direction of the rotor. In the angular position of the rotor illustrated in FIG. 5, the cylindrical elements 551 and 552 are further aligned with a hole 527a in the rotor brake disc 527. Thereby, the rotor can be fixed relative to the stator (not shown) by inserting a fastening member, such as a bolt, into the opening 553 such that it extends through the outer cylindrical element 551, through the hole 527a in the rotor brake disc 527 and into or through the inner cylindrical element 552. The respective inner surfaces 551a and 552a of the inner and outer cylindrical elements 551, 552 may be threaded such that the fastening element can be screw-fitted into the cylindrical elements 551, 552. The hole 527a may have a smooth surface or may also have a threaded surface fitting the fastening element.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A generator for a wind turbine, comprising:
   a stator;
   a rotor comprising a rotor housing surrounding the stator; and
   a main bearing adapted to support the rotor housing to be rotatable about an axis of rotation,
   wherein the stator comprises a plurality of cylindrical elements extending in parallel with the axis of rotation, and
   wherein the rotor comprises a front element having a plurality of holes at positions aligned with the cylindrical elements, and
   wherein the rotor is fixable to the stator by inserting fastening members through the cylindrical elements and the holes aligned with the cylindrical elements;
   further comprising a rotor brake and a rotor lock, wherein the rotor brake comprises a brake disc and the rotor lock comprises a lock bracket,
   wherein the rotor brake and the lock bracket are fixed relative to the stator,
   wherein the lock bracket comprises a recess for receiving the brake disc and is adapted to engage with the brake disc to lock the rotor at a predetermined angular position,
   wherein a further plurality of cylindrical elements extending in parallel with the axis of rotation is arranged at the lock bracket,
   wherein the brake disc comprises a further plurality of holes aligned with the further cylindrical elements, and
   wherein the rotor is further fixed to the stator by inserting further fastening members through the further cylindrical elements the further holes aligned with the further cylindrical elements.

2. The generator according to claim 1, wherein the cylindrical elements and/or the holes and/or the fastening members are threaded.

3. The generator according to claim 1, wherein the cylindrical elements and the holes are provided at positions that are symmetrical around the axis of rotation.

4. The generator according to claim 1, wherein the fastening members are storable within a main shaft or nacelle of a wind turbine.

5. The generator according to claim 1, wherein the stator comprises a front stator plate, a rear stator plate and a plurality of stator segments distributed around the axis of rotation being supported by the front stator plate and the rear stator plate.

6. The generator according to claim 5, wherein the cylindrical elements are arranged at the front stator plate.

7. A method for manufacturing a generator for a wind turbine, comprising:
   providing a stator;
   providing a rotor comprising a rotor housing surrounding the stator;
   providing a main bearing for supporting the rotor so that the rotor housing is rotatable about an axis of rotation;
   providing the stator with a plurality of cylindrical elements extending in parallel with the axis of rotation;
   providing a front element of the rotor with a plurality of holes at positions aligned with the cylindrical elements; and
   fixing the rotor to the stator by inserting fastening members through the cylindrical elements and the holes aligned with the cylindrical elements;
   providing a rotor brake and a rotor lock, wherein the rotor brake comprises a brake disc and the rotor lock comprises a lock bracket,
   fixing the rotor brake and the lock bracket relative to the stator, wherein the lock bracket comprises a recess for receiving the brake disc and is adapted to engage with the brake disc to lock the rotor at a predetermined angular position,
   providing a further plurality of cylindrical elements extending in parallel with the axis of rotation arranged at the lock bracket,
   wherein the brake disc comprises a further plurality of holes aligned with the further cylindrical elements, and wherein the rotor is further fixed to the stator by inserting further fastening members through the further cylindrical elements the further holes aligned with the further cylindrical elements.

8. A method for performing a maintenance work on a main bearing of a wind turbine generator, comprising:
   providing the generator according to claim 1;
   rotating the rotor to a position where the plurality of holes are aligned with the cylindrical elements in an axial direction;
   stopping the rotor;
   fixing the rotor to the stator by inserting fastening members through the cylindrical elements and the holes aligned with the cylindrical elements; and
   performing the maintenance work on the main bearing.

9. The method according to claim 8, wherein the maintenance work comprises repairing or exchanging parts of the main bearing or exchanging the main bearing.

10. The method according to claim 8, further comprising removing a rotor hub and a blade assembly from the main bearing prior to performing the maintenance work.

* * * * *